(12) United States Patent
Varigonda et al.

(10) Patent No.: US 11,967,854 B2
(45) Date of Patent: Apr. 23, 2024

(54) BATTERY-ULTRACAPACITOR HYBRID ENERGY STORAGE SYSTEM ARCHITECTURE FOR MILD-HYBRID POWER SYSTEMS

(71) Applicant: Cummins Inc., Columbus, IN (US)

(72) Inventors: Subbarao Varigonda, Columbus, IN (US); Jaroslaw Leonarski, Columbus, IN (US); Harsha R. Ademane, Indianapolis, IN (US)

(73) Assignee: CUMMINS INC., Columbus, IN (US)

( * ) Notice: Subject to any disclaimer, the term of this patent is extended or adjusted under 35 U.S.C. 154(b) by 444 days.

(21) Appl. No.: 17/433,116

(22) PCT Filed: Jan. 23, 2020

(86) PCT No.: PCT/US2020/014736
§ 371 (c)(1),
(2) Date: Aug. 23, 2021

(87) PCT Pub. No.: WO2020/214225
PCT Pub. Date: Oct. 22, 2020

(65) Prior Publication Data
US 2022/0190629 A1 Jun. 16, 2022

Related U.S. Application Data

(60) Provisional application No. 62/833,823, filed on Apr. 15, 2019.

(51) Int. Cl.
*H02J 7/34* (2006.01)
*B60K 6/28* (2007.10)
(Continued)

(52) U.S. Cl.
CPC ............... *H02J 7/345* (2013.01); *B60K 6/28* (2013.01); *H01M 10/44* (2013.01);
(Continued)

(58) Field of Classification Search
CPC ...................................................... H02J 7/345
(Continued)

(56) References Cited

U.S. PATENT DOCUMENTS 5,723,956 A * 3/1998 King ............... H02M 1/14
318/440
8,729,864 B2 5/2014 Dittmer
(Continued)

FOREIGN PATENT DOCUMENTS

CN 101356707 A 1/2009
CN 103250322 A 8/2013
(Continued)

OTHER PUBLICATIONS

Supplementary European Search Report for EP 20791770, dated Dec. 13, 2022.
(Continued)

*Primary Examiner* — Edward Tso
*Assistant Examiner* — Ahmed H Omar
(74) *Attorney, Agent, or Firm* — Faegre Drinker Biddle & Reath LLP (57) ABSTRACT

A mild-hybrid energy storage system architecture is provided, comprising: a battery; an ultracapacitor connected in parallel with the battery; a passive battery pre-charge circuit connected between a terminal of the battery and a DC bus; a battery main contactor connected in parallel with the battery pre-charge circuit between the terminal of the battery and the DC bus; a passive ultracapacitor pre-charge circuit connected between a terminal of the ultracapacitor and the DC bus; an ultracapacitor main contactor connected in parallel with the ultracapacitor pre-charge circuit between the terminal of the ultracapacitor and the DC bus; and a control module configured to independently control operation of the battery pre-charge circuit, the battery main
(Continued)

contactor, the ultracapacitor pre-charge circuit and the ultracapacitor main contactor.

16 Claims, 6 Drawing Sheets

(51) Int. Cl.
    *H01M 10/44*     (2006.01)
    *H01M 10/0525*     (2010.01)
    *H01M 10/48*     (2006.01)

(52) U.S. Cl.
    CPC ........ *H01M 10/0525* (2013.01); *H01M 10/48* (2013.01); *H01M 2220/20* (2013.01)

(58) Field of Classification Search
    USPC .......................................................... 320/167
    See application file for complete search history.

(56) References Cited

U.S. PATENT DOCUMENTS

| | | | |
|---|---|---|---|
| 9,466,997 B2 | 10/2016 | Silva | |
| 9,573,474 B2* | 2/2017 | Mensah-Brown | B60L 50/40 |
| 10,077,752 B1 | 9/2018 | Lee et al. | |
| 10,119,514 B2 | 11/2018 | Averbukh et al. | |
| 2002/0158513 A1 | 10/2002 | Amano et al. | |
| 2006/0103358 A1 | 5/2006 | Schulte et al. | |
| 2006/0127704 A1* | 6/2006 | Raiser | H02J 7/345 |
| | | | 320/101 |
| 2007/0159007 A1* | 7/2007 | King | B60L 58/21 |
| | | | 307/71 |
| 2010/0276993 A1 | 11/2010 | King | |
| 2012/0068532 A1* | 3/2012 | Tanabe | B60L 3/0007 |
| | | | 340/436 |
| 2012/0235511 A1 | 9/2012 | Watson et al. | |
| 2013/0234508 A1 | 9/2013 | Eisele et al. | |
| 2013/0257301 A1* | 10/2013 | Tran | H02M 7/48 |
| | | | 315/200 R |
| 2013/0264875 A1 | 10/2013 | Kaminsky et al. | |
| 2014/0009090 A1* | 1/2014 | Ashida | B60L 50/40 |
| | | | 318/139 |
| 2014/0244082 A1 | 8/2014 | Caron | |
| 2015/0295421 A1 | 10/2015 | Blakemore | |
| 2015/0352961 A1 | 12/2015 | Kim et al. | |
| 2016/0052383 A1 | 2/2016 | Caron | |
| 2016/0332522 A1 | 11/2016 | Steil | |
| 2018/0030945 A1 | 2/2018 | Caballero Atienzar | |

FOREIGN PATENT DOCUMENTS

| | | |
|---|---|---|
| CN | 103534134 A | 1/2014 |
| CN | 104002656 A | 8/2014 |
| CN | 104937175 A | 9/2015 |
| JP | 2006-314172 A | 11/2006 |
| WO | 2007081495 A2 | 7/2007 |
| WO | 2013180018 A1 | 12/2013 |

OTHER PUBLICATIONS

International Search Report and Written Opinion issued by the ISA/US, Commissioner for Patents, dated Apr. 23, 2020, for International Application No. PCT/US2020/014736; 7 pages.

* cited by examiner

| Attribute/Functional Requirement | Architecture 100 of FIG. 5 | Passive HESS with pre-charge on battery | Passive HESS with pre-charge on bus side | Active HESS with DC/DC on UC | Active HESS with DC/DC on Battery | Battery only Energy Storage |
|---|---|---|---|---|---|---|
| Cost | Med | Med | Med | High | High | Low |
| HESS assembly complexity | Low | Low | High | High | High | Low |
| HESS control complexity | Low | Low | Low | Med | Med | Low |
| Ability to isolate UC to reduce leakage via DC bus and eliminate the need to pre-charge UC | Yes | No | Yes | Yes | No | N/A |
| Ability pre-charge DC bus quickly (< 2 s) with a compact pre-charge circuit | Yes | No | Yes | Yes | Yes | Yes |
| Engine Start Reliability | High | Med | High | High | Med | Low |

FIG. 6 under a BATTERY-ULTRACAPACITOR HYBRID ENERGY STORAGE SYSTEM ARCHITECTURE FOR MILD-HYBRID POWER SYSTEMS

RELATED APPLICATIONS

This application is a national phase filing of International Application No. PCT/US2020/014736, filed Jan. 23, 2020 which claims priority to U.S. Provisional Application Ser. 62/833,823, entitled "A BATTERY-ULTRACAPACITOR HYBRID ENERGY STORAGE SYSTEM ARCHITECTURE FOR MILD-HYBRID POWER SYSTEMS," filed on Apr. 15, 2019, the entire contents of which being expressly incorporated herein by reference.

GOVERNMENT SUPPORT CLAUSE

This invention was made with Government support under DE-EE0007761 awarded by DOE. The Government has certain rights in this invention.

FIELD OF THE DISCLOSURE

The present disclosure generally relates to hybrid energy storage system architecture, and more specifically to a HESS architecture for mild-hybrid powertrain applications that employs dedicated pre-charge circuits and main contactors for a battery and an ultracapacitor.

BACKGROUND OF THE DISCLOSURE

Low voltage (e.g., 48 volts) mild-hybrid powertrain systems are of interest for commercial vehicles because they are relatively low cost and provide reasonable levels of fuel savings resulting in attractive payback on investment. Certain mild-hybrid powertrain systems employ a hybrid energy storage system ("HESS") including a battery and an ultracapacitor ("UC"). A UC, sometimes referred to as a supercapacitor, is a high-capacity capacitor with lower voltage limits that bridges the gap between electrolytic capacitors and rechargeable batteries. Such UCs can reduce the load on the battery of a HESS by absorbing fast voltage and/or current transients and very quickly releasing power, but at low energy compared to a battery, which typically has an order of magnitude more energy storage capacity. The UC essentially smooths battery cycle transitions and consequently can improve battery thermal behavior and life. A UC can reliably support engine start functions but cannot by itself, support mild-hybrid functions with a targeted level of regenerative energy recovery. An energy storage system including a battery, such as a Lithium-ion battery, is needed to realize mild-hybrid value.

Interest in utilizing 48V engine starter motors and the perceived risks in relying exclusively on a Lithium-ion battery for engine starting have led some manufacturers to add a UC, thereby configuring an HESS. The interconnection aspects of a battery and a UC introduce tradeoffs in cost and functionality and can be optimized based on application context and design requirements. To date, powertrain systems employing an HESS either limit operational flexibility to a level that is inadequate for medium duty or heavy duty commercial vehicle applications or require the use of added components which increase the cost and complexity of the HESS to meet the desired operational requirements. Thus, a low cost, highly reliable, high performance HESS architecture is needed for mild-hybrid applications such as for commercial vehicles.

SUMMARY

According to one embodiment, the present disclosure provides a mild-hybrid energy storage system architecture, comprising: a battery; an ultracapacitor connected in parallel with the battery; a passive battery pre-charge circuit connected between a terminal of the battery and a DC bus; a battery main contactor connected in parallel with the battery pre-charge circuit between the terminal of the battery and the DC bus; a passive ultracapacitor pre-charge circuit connected between a terminal of the ultracapacitor and the DC bus; an ultracapacitor main contactor connected in parallel with the ultracapacitor pre-charge circuit between the terminal of the ultracapacitor and the DC bus; and a control module configured to independently control operation of the battery pre-charge circuit, the battery main contactor, the ultracapacitor pre-charge circuit and the ultracapacitor main contactor. In one aspect of this embodiment, the battery includes at least one Lithium-ion cell. In another aspect, the passive battery pre-charge circuit includes a resistor connected between the terminal of the battery and an input of a pre-charge switch, an output of the pre-charge switch being connected to the DC bus. In yet another aspect, the passive ultracapacitor pre-charge circuit includes a resistor connected between the terminal of the ultracapacitor and an input of a pre-charge switch, an output of the pre-charge switch being connected to the DC bus. In a further aspect of this embodiment, the terminal of the battery is a positive terminal and the terminal of the ultracapacitor is a positive terminal. Another aspect further comprises a first voltage sensor configured to provide ultracapacitor voltage measurements to the control module. A variant of this aspect further comprises a second voltage sensor configured to provide DC bus voltage measurements to the control module. Another variant further comprises a third voltage sensor configured to provide battery voltage measurements to the control module. In another aspect of this embodiment, the control module is further configured to: respond to a voltage of the ultracapacitor being approximately zero by closing a battery pre-charge switch of the passive battery pre-charge circuit to pre-charge the DC bus; after pre-charging the DC bus, activate an engine starter to start an engine; and after activating the engine starter, closing an ultracapacitor pre-charge switch of the passive ultracapacitor pre-charge circuit to charge the ultracapacitor. In a variant of this aspect, the control module is further configured to: shut down the engine; and after shutting down the engine, open the ultracapacitor pre-charge switch and the ultracapacitor main contactor to isolate the ultracapacitor. In another variant, the control module is further configured to respond to the voltage being above a predetermined threshold voltage by closing the ultracapacitor pre-charge switch and closing the ultracapacitor main contactor before closing the battery pre-charge switch. In yet another variant, the control module is further configured to respond to the voltage being above a predetermined threshold voltage by closing the ultracapacitor pre-charge switch, closing the ultracapacitor main contactor and closing the battery pre-charge switch approximately simultaneously.

In another embodiment, the present disclosure provides a method for controlling an engine in a mild-hybrid system, comprising: sensing a voltage of an ultracapacitor; responding to the voltage being approximately zero by closing a battery pre-charge switch of a passive battery pre-charge circuit connected between a terminal of a battery and a DC bus coupled to an engine starter to pre-charge the DC bus; after pre-charging the DC bus, activating the engine starter to start the engine; and after activating the engine starter, closing an ultracapacitor pre-charge switch of a passive ultracapacitor pre-charge circuit connected between a terminal of the ultracapacitor and the DC bus to charge the ultracapacitor. One aspect of this embodiment further comprises shutting down the engine; and after shutting down the engine, opening the ultracapacitor pre-charge switch and a main contactor connected in parallel with the passive ultracapacitor pre-charge circuit to isolate the ultracapacitor. Another aspect further comprises responding to the voltage being above a predetermined threshold voltage by closing the ultracapacitor pre-charge switch and closing a main contactor connected in parallel with the passive ultracapacitor pre-charge circuit before closing the battery pre-charge switch. Yet another aspect further comprises responding to the voltage being above a predetermined threshold voltage by closing the ultracapacitor pre-charge switch, closing a main contactor connected in parallel with the passive ultracapacitor pre-charge circuit and closing the battery pre-charge switch approximately simultaneously.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Figure 1:
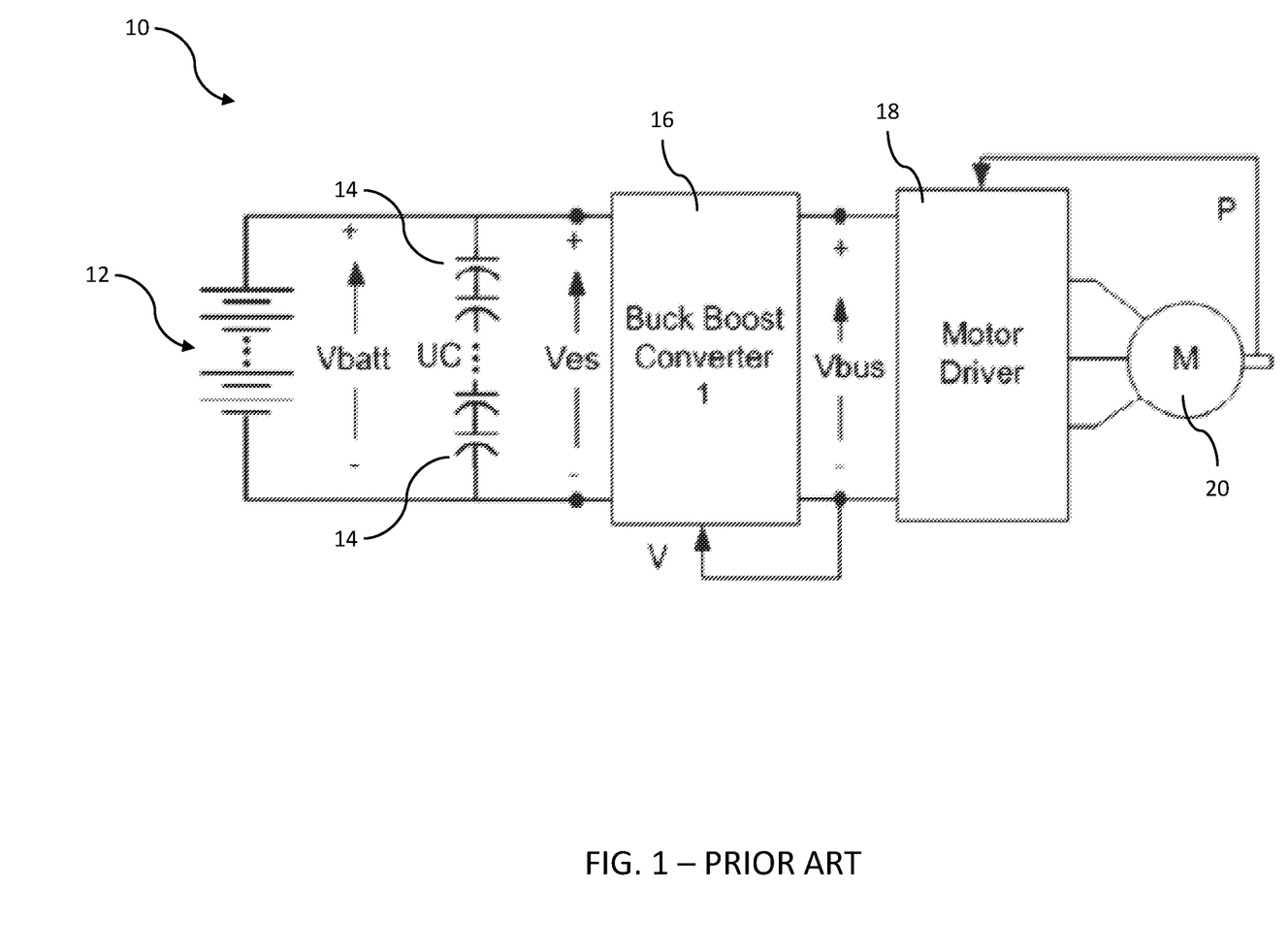
FIG. 1 is a schematic diagram of a prior art HESS architecture.

Referring now to FIG. 1, a prior art passive HESS architecture 10 is shown. Architecture 10 is exemplary of certain architectures used in the telecommunications industry, having a direct parallel combination of UCs with batteries such as Lithium-ion cells. In general, architecture 10 includes a battery 12 connected in parallel with series connected carbon-carbon UCs 14. The parallel combination is connected to a buck boost converter 16, which outputs a DC bus voltage to a motor driver 18 connected to a motor 20. In this example, UC 14 (when appropriately sized) supplies a major portion of the burst power needed during transmission (because of its very low equivalent series resistance), while battery 12 provides essentially all of the reserve power and standby power. No pre-charge circuit is used in architecture 10 because it uses buck boost converter 16. As a result, architecture 10 is relatively complex and expensive.

Figure 2:
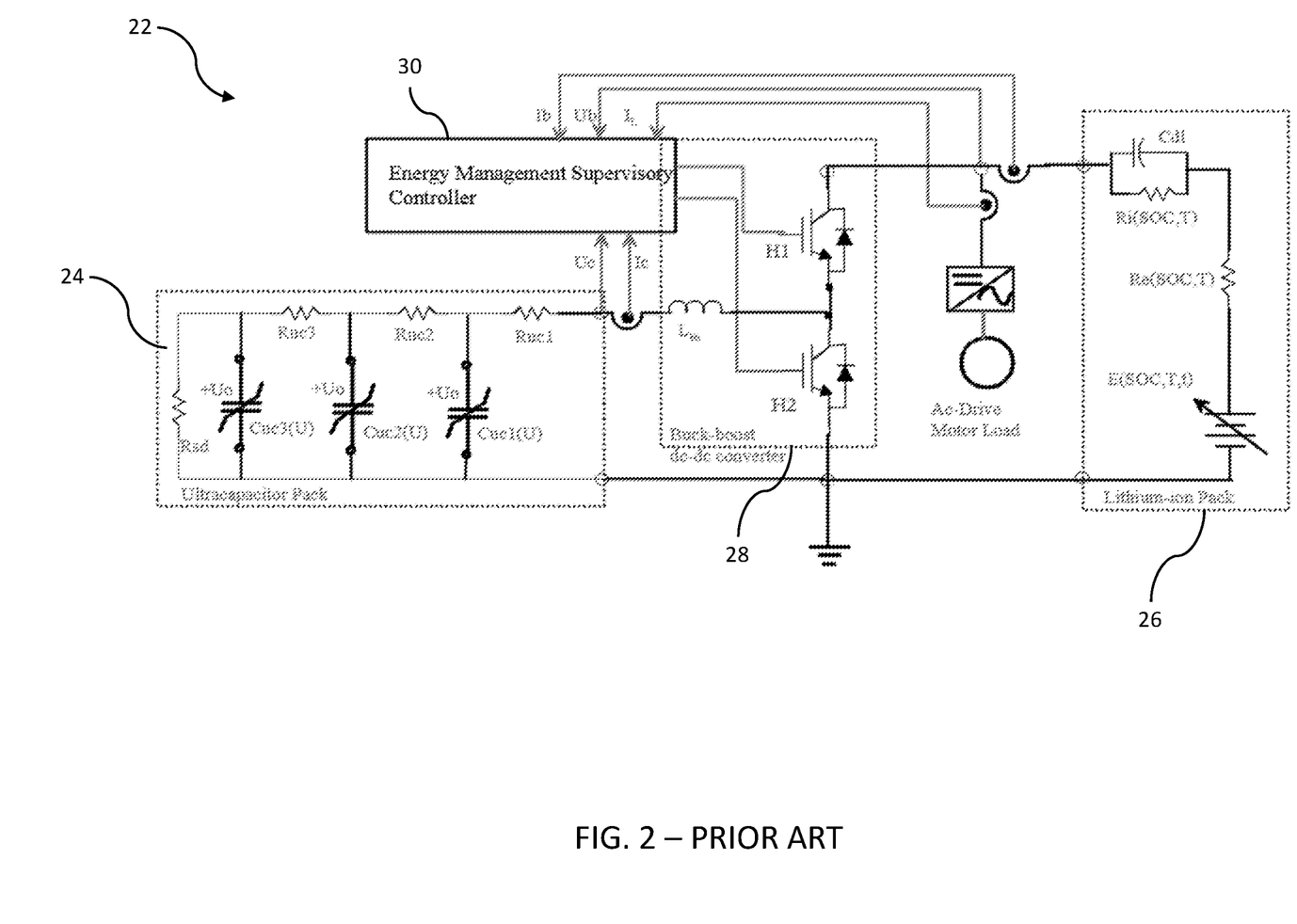
FIG. 2 is a schematic diagram of another prior art HESS architecture.
Figure 3:
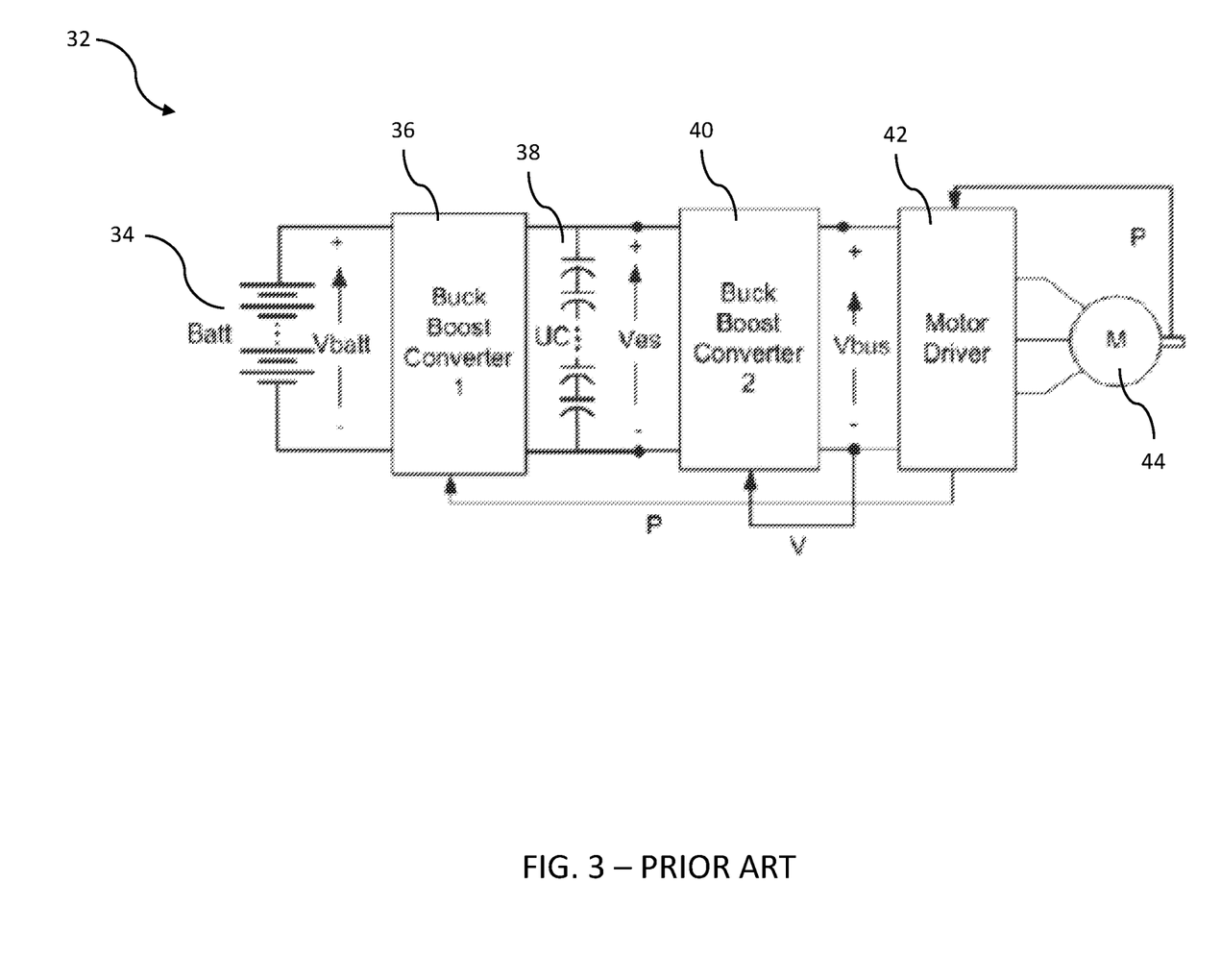
FIG. 3 is a schematic diagram of another prior art HESS architecture.
Figure 4:
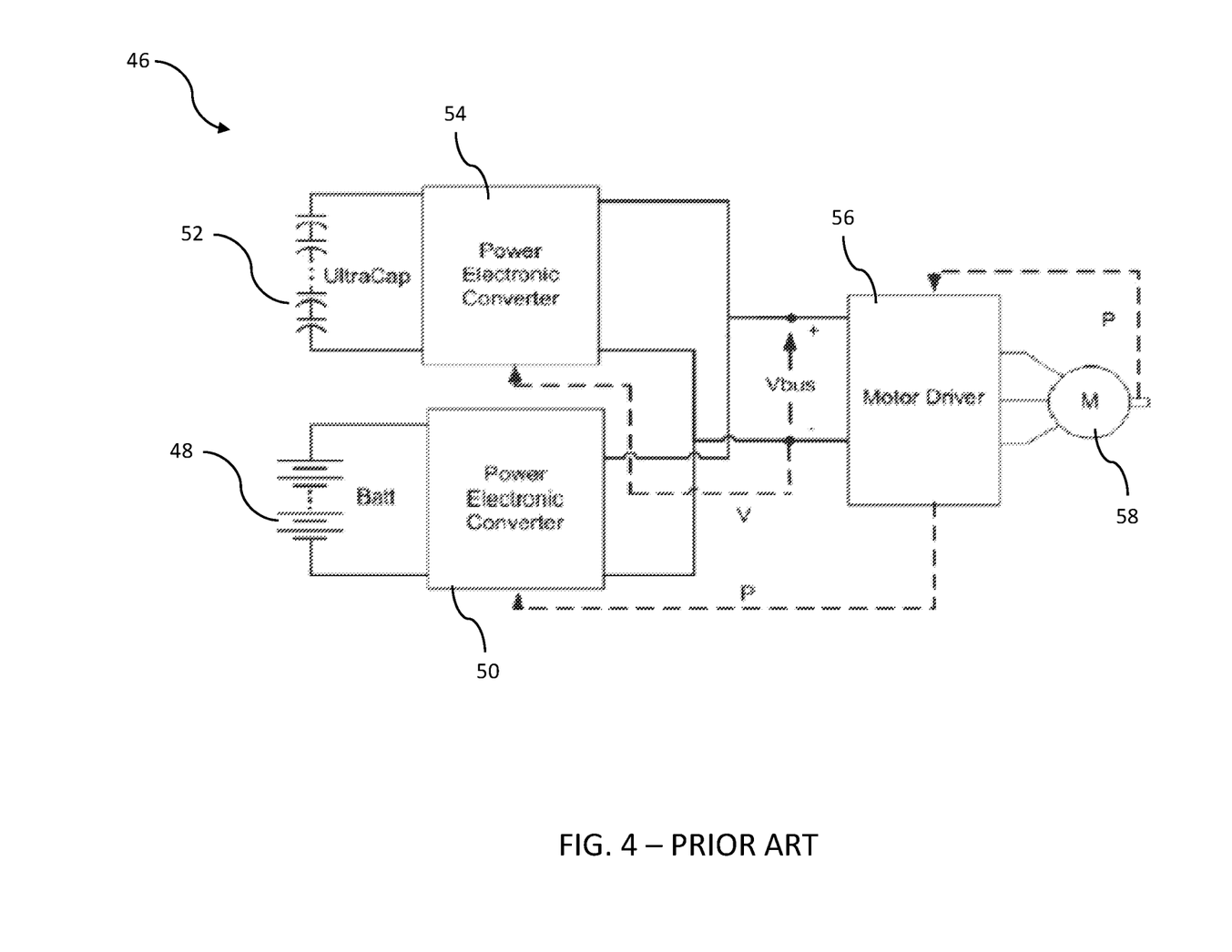
FIG. 4 is a schematic diagram of another prior art HESS architecture.

FIG. 2 depicts an active parallel connection HESS architecture 22 with a UC pack 24, a Lithium-ion battery pack 26 and a buck boost converter 28, all in communication with a supervisory control module ("SCM") 30. Again, the use of a buck boost converter results in increased complexity and cost. FIG. 3 depicts another prior art HESS architecture 32 configured as a bi-directional DC/DC converter with a battery 34 connected to a first buck boost converter 36, a plurality of UCs 38 connected between first buck boost converter 36 and a second buck boost converter 40, the output of which is connected to a motor driver 42 which drives a motor 44. FIG. 4 also depicts a prior art HESS architecture 46 configured as a bi-directional DC/DC converter with a battery 48 connected to a first converter 50 and a plurality of UCs 52 connected to a second converter 54. The positive and negative terminals of converters 50, 54 are connected together to form the DC bus provided to a motor driver 56 which drives a motor 58. The configurations of FIGS. 3 and 4 are also relatively complex and expensive.

Figure 5:
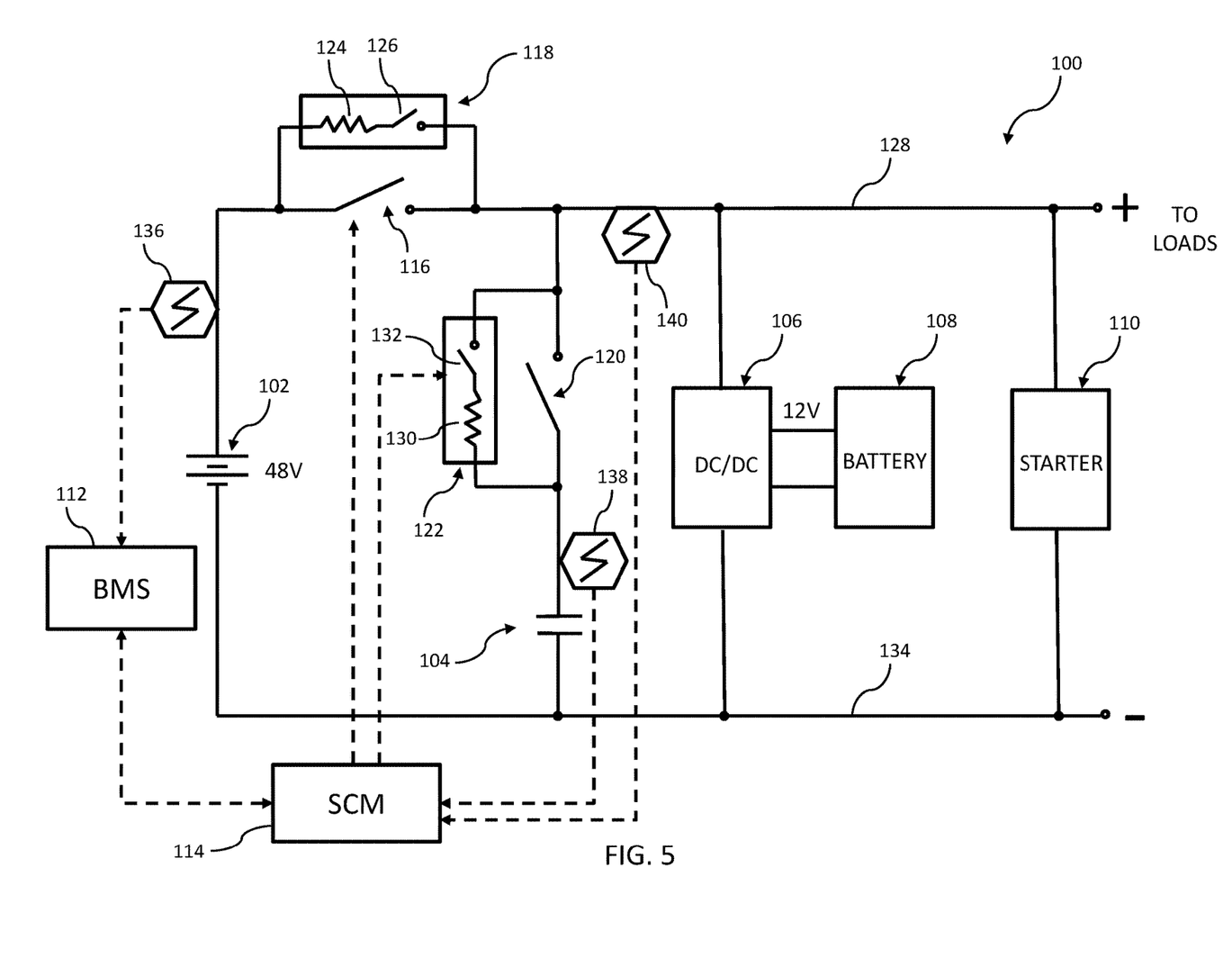
FIG. 5 is a schematic diagram of an HESS architecture according to one embodiment of the present disclosure.

Referring now to FIG. 5, a hybrid energy storage system ("HESS") architecture for a mild-hybrid powertrain application according to the present disclosure is shown. Architecture 100 generally includes a battery 102, an ultracapacitor ("UC") 104, a DC/DC converter 106, a low voltage battery 108, a starter 110, a battery management system ("BMS") 112 and a supervisory control module ("SCM")

114. As certain functions of BMS 112 and SCM 114 may be performed by either or both devices, the devices may be referred to simply as a "control module." Architecture 100 further includes a main contactor 116 coupled to the positive terminal of battery 102, and a pre-charge circuit 118 connected in parallel across main contactor 116. Similarly, a main contactor 120 is coupled to the positive terminal of UC 104 and a pre-charge circuit 122 is connected in parallel across main contactor 120. Pre-charge circuit 118 includes a resistor 124 with one side connected to the positive terminal of battery 102 and another side connected to an input of a pre-charge switch 126. The output of pre-charge switch 126 is connected to the output of main contactor 116, both being connected to the positive terminal 128 of the DC bus. Similarly, pre-charge circuit 122 includes a resistor 130 with one side connected to the positive terminal of UC 104 and another side connected to an input of a pre-charge switch 132. The output of pre-charge switch 132 is connected to the output of main contactor 120, both being connected to positive terminal 128 of the DC bus. The negative terminal of battery 102 and the negative terminal of UC 104 are connected to the negative terminal 134 of the DC bus. As shown, DC/DC converter 106 is connected between positive terminal 128 and negative terminal 134 and is configured to provide low voltage (e.g., 12 volts) power to battery 108. Similarly, starter 110 is connected between positive terminal 128 and negative terminal 134. Positive terminal 128 and negative terminal 134 are in turn connected to various loads powered by architecture 100.

A voltage sensor 136 is depicted as being coupled to the positive terminal of battery 102. Voltage sensor 136 may be implemented in any of a variety of ways configured to measure the voltage of battery 102. Voltage sensor 136 provides battery voltage measurements to BMS 112. BMS 112 in turn provides the battery voltage measurements to SCM 114. Similarly, a voltage sensor 138 is depicted as being coupled to the positive terminal of UC 104. Voltage sensor 138 may also be implemented in any of a variety of ways configured to measure the voltage of UC 104. Voltage sensor 138 provides UC voltage measurements to SCM 114. Another voltage sensor 140 is depicted as being coupled to positive terminal 128 of the DC bus. Voltage sensor 140 may also be implemented in any of a variety of ways configured to measure the voltage at positive terminal 128. Voltage sensor 140 provides DC bus voltage measurements to SCM 114. As is further described herein, SCM 114 is connected to main contactor 116, pre-charge circuit 118, main contactor 120 and pre-charge circuit 122 as indicated by dashed lines in FIG. 5. In general, SCM 114 uses the voltage measurements from voltage sensors 136, 138 and 140 to control the operation of main contactor 116, pre-charge circuit 118, main contactor 120 and pre-charge circuit 122.

It should be understood that some ultracapacitors may include internal voltage sensors and communication circuitry. If such ultracapacitors are used as UC 104, then voltage sensor 138 would be unnecessary and can be omitted. Additionally, in certain embodiments voltage sensor 140 may be eliminated and a voltage sensor already present in, for example, DC/DC converter 106 or battery 108 or another power converter/inverter (not shown in FIG. 5) may be used. In addition, the ultracapacitor pre-charge function may be implemented outside of the SCM 114 within a local controller that communicates with the SCM 114 at a supervisory level (e.g., responding to connect/disconnect commands and reporting the status).

It should be understood that in an alternative embodiment, UC 104 could be directly connected to positive terminal 128 of the DC bus (i.e., main contactor 120 and pre-charge circuit 122 would be omitted). In such an embodiment, however, it would be necessary to wait for pre-charge of UC 104 by battery 102 to occur at, for example, engine start-up. In instances where UC 104 is at or near zero volts at start-up, pre-charging by battery 102 may take many minutes (e.g., 20 to 30 minutes). This delay on engine start-up is inconsistent with the design considerations taken into account during development of architecture 100. Architecture 100 is designed to provide DC bus pre-charge and engine start-up functions within in a matter of seconds rather than minutes.

In operation, SCM 114 of architecture 100 is configured to independently control pre-charge circuits 118, 122 and main contactors 116, 120 to achieve the desired performance. For example, in instances where UC 104 is at or near zero volts at engine start-up (as indicated by the UC voltage measurements provided by voltage sensor 138 to SCM 114), SCM 114 may close only pre-charge switch 126 (leaving UC 104 disconnected from the DC bus) or close both pre-charge switches 126 and 132. In this manner, battery 102 can charge the DC bus quickly, while deferring the pre-charge of UC 104 which could take a much longer period of time. Thus, all of the loads connected to the DC bus, including starter 110, may be used quickly (e.g., within one or two seconds). It should be understood that if pre-charge circuit 122 and main contactor 120 were not present, a significant delay would be required before operating any of the capacitive loads in parallel with UC 104. The delay would correspond to the time required to charge UC 104. SCM 114 may be programmed with voltage thresholds to use in the determination of when to close and open pre-charge switches 126, 132 and main contactors 116, 120.

If should further be understood from the foregoing that UC 104 and the DC bus may maintain a non-zero voltage when the engine is shut down. The DC bus does not need to be deenergized (and therefore no such circuits are required) because the mild-hybrid system is a relatively low voltage system (e.g., 48 volts), posing no high voltage safety concerns. Battery 102 may simply be disconnected for safety by BMS 112 or SCM 114 opening main contactor 116. When engine start-up is commanded, BMS 112 or SCM 114 may sense the voltage of UC 104 using sensor 138 or otherwise and if the sensed voltage is above a pre-determined threshold voltage (e.g., 43 volts), BMS 112 or SCM 114 may close main contactor 116 and the DC bus may quickly reach the desired operating voltage because UC 104 has maintained the DC bus at a higher, non-zero voltage during engine shut down.

Architecture 100 is also configured to address voltage leakage of UC 104 over time. It is known that if UC 104 is left connected to the DC bus for an extended period of time, the voltage of UC 104 will slowly decrease due to leakage. Thus, architecture 100 permits SCM 114 to isolate UC 104 by opening switch 132 and main contactor 120 at engine shut down, thereby maintaining the operating voltage of UC 104 for a further extended period of time. Upon the next engine start-up, SCM 114 may connect UC 104 to the DC bus (by closing pre-charge switch 132 and then main contactor 120) before connecting battery 102 to the DC bus or at the same time as connecting battery 102. Alternatively, battery 102 may be connected to the DC bus first to ensure that all of the pre-charge current is provided to DC bus enabling quick starter 110 usage instead of some of it being used to charge UC 104. In this instance, SCM 114 would retain UC 104 in a disconnected configuration to use the high power provided by battery 102 to support the engine start-up. It should be understood, however, that in cold start conditions, it may be necessary for SCM 114 to connect both battery 102 and UC 104 upon start-up because the cranking current provided by a lithium-ion battery such as battery 102 may be insufficient in very cold weather. In any case, the DC bus pre-charge process supported by architecture 100 is rapid compared to alternative systems.

Figure 6:
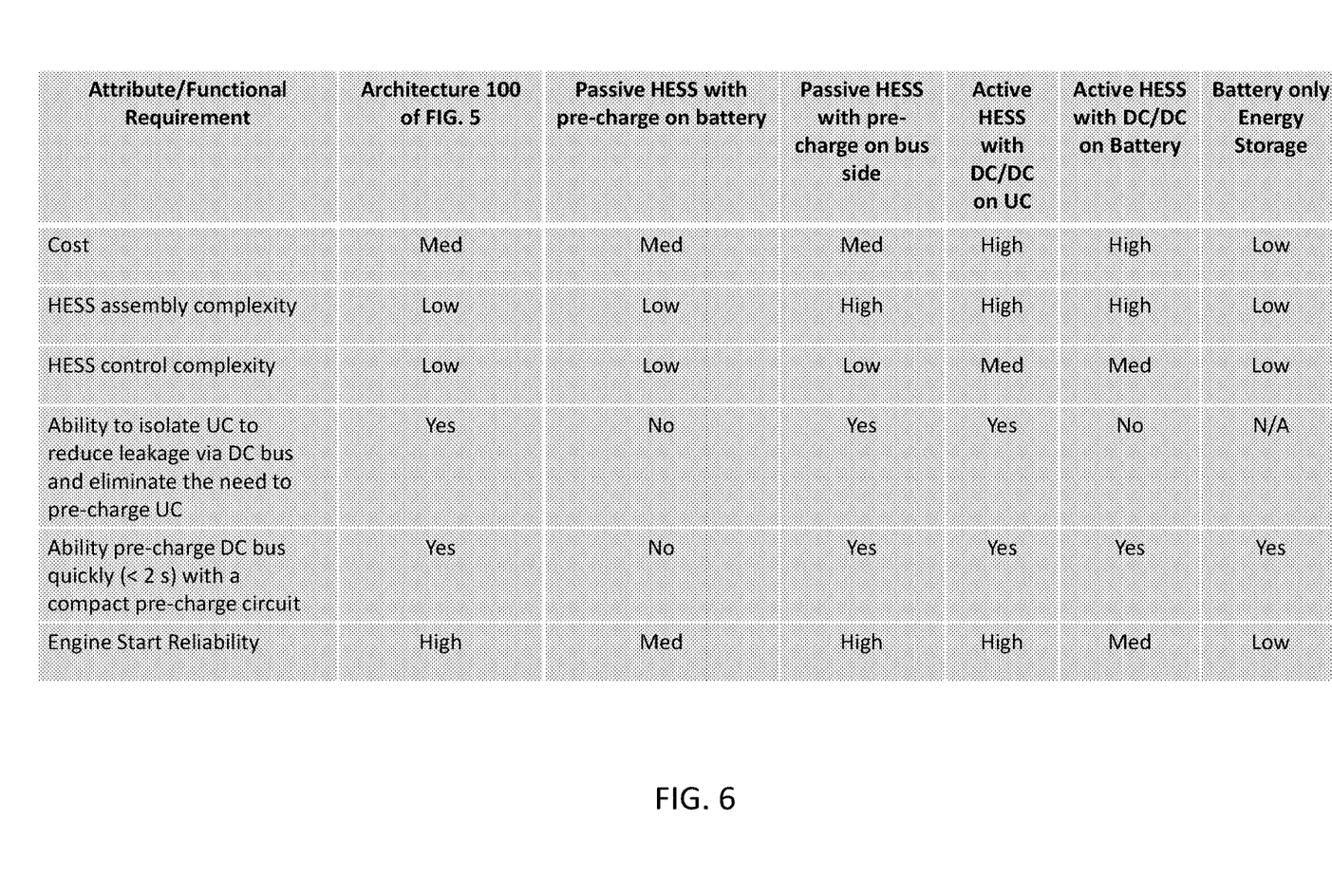
FIG. 6 is a table illustrating a comparison of various HESS architectures relative to certain performance attributes.

FIG. 6 provides a table comparing various different architectures in terms of several attributes or functional requirements. The first column lists the attributes or functional requirements. The second column shows the rating of architecture 100 of the present disclosure as depicted in FIG. 5. The remaining columns show the ratings of various other prior art architectures. As shown, architecture 100 is of medium cost compared to higher cost active HESS architectures such as those depicted in FIGS. 1-4. A battery only energy storage system is shown as low cost, but such a system is not suitable for mild-hybrid powertrain applications for commercial vehicles. Architecture 100 is rated low in terms of assembly complexity and control complexity compared to other architectures (except the battery only system). Architecture 100 also provides the ability to isolate UC 104 to reduce leakage and eliminate the need to pre-charge UC 104 as described herein. Other architectures provide this feature as shown, but at either a higher cost or higher complexity, or both. Architecture 100 also provides very rapid pre-charging of the DC bus, and high reliability for engine start-up, in part because of the ability to isolate UC 104.

As should be apparent from the foregoing, architecture 100 according to the present disclosure is designed to provide a low component count, in part by eliminating the need for a dedicated DC bus discharge circuit, which results in low cost and high reliability. Instead of a dedicated discharge circuit (e.g., a resistor), the embodiments of the present disclosure leverage the active discharge mechanisms supported by the power inverters and DC/DC converters that are already part of the overall mild-hybrid system.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mild-hybrid energy storage system architecture, comprising:
    a battery;
    an ultracapacitor connected in parallel with the battery;
    a passive battery pre-charge circuit connected between a terminal of the battery and a DC bus;
    a battery main contactor connected in parallel with the battery pre-charge circuit between the terminal of the battery and the DC bus;
    a passive ultracapacitor pre-charge circuit connected between a terminal of the ultracapacitor and the DC bus;
    an ultracapacitor main contactor connected in parallel with the ultracapacitor pre-charge circuit between the terminal of the ultracapacitor and the DC bus; and
    a control module configured to independently control operation of the battery pre-charge circuit, the battery main contactor, the ultracapacitor pre-charge circuit and the ultracapacitor main contactor.

2. The mild-hybrid energy storage system architecture of claim 1, wherein the battery includes at least one Lithium-ion cell.

3. The mild-hybrid energy storage system architecture of claim 1, wherein the passive battery pre-charge circuit includes a resistor connected between the terminal of the battery and an input of a pre-charge switch, an output of the pre-charge switch being connected to the DC bus.

4. The mild-hybrid energy storage system architecture of claim 1, wherein the passive ultracapacitor pre-charge circuit includes a resistor connected between the terminal of the ultracapacitor and an input of a pre-charge switch, an output of the pre-charge switch being connected to the DC bus.

5. The mild-hybrid energy storage system architecture of claim 1, wherein the terminal of the battery is a positive terminal and the terminal of the ultracapacitor is a positive terminal.

6. The mild-hybrid energy storage system architecture of claim 1, further comprising a first voltage sensor configured to provide ultracapacitor voltage measurements to the control module.

7. The mild-hybrid energy storage system architecture of claim 6, further comprising a second voltage sensor configured to provide DC bus voltage measurements to the control module.

8. The mild-hybrid energy storage system architecture of claim 7, further comprising a third voltage sensor configured to provide battery voltage measurements to the control module.

9. The mild-hybrid energy storage system architecture of claim 1, wherein the control module is further configured to:
respond to a voltage of the ultracapacitor being approximately zero by closing a battery pre-charge switch of the passive battery pre-charge circuit to pre-charge the DC bus;
after pre-charging the DC bus, activate an engine starter to start an engine; and
after activating the engine starter, closing an ultracapacitor pre-charge switch of the passive ultracapacitor pre-charge circuit to charge the ultracapacitor.

10. The mild-hybrid energy storage system architecture of claim 9, wherein the control module is further configured to:
shut down the engine; and
after shutting down the engine, open the ultracapacitor pre-charge switch and the ultracapacitor main contactor to isolate the ultracapacitor.

11. The mild-hybrid energy storage system architecture of claim 9, wherein the control module is further configured to respond to the voltage being above a predetermined threshold voltage by closing the ultracapacitor pre-charge switch and closing the ultracapacitor main contactor before closing the battery pre-charge switch.

12. The mild-hybrid energy storage system architecture of claim 9, wherein the control module is further configured to respond to the voltage being above a predetermined threshold voltage by closing the ultracapacitor pre-charge switch, closing the ultracapacitor main contactor and closing the battery pre-charge switch approximately simultaneously.

13. A method for controlling an engine in a mild-hybrid system, comprising:
sensing a voltage of an ultracapacitor;
responding to the voltage being approximately zero by closing a battery pre-charge switch of a passive battery pre-charge circuit connected between a terminal of a battery and a DC bus coupled to an engine starter to pre-charge the DC bus;
after pre-charging the DC bus, activating the engine starter to start the engine; and
after activating the engine starter, closing an ultracapacitor pre-charge switch of a passive ultracapacitor pre-charge circuit connected between a terminal of the ultracapacitor and the DC bus to charge the ultracapacitor.

14. The method of claim 13, further comprising:
shutting down the engine; and
after shutting down the engine, opening the ultracapacitor pre-charge switch and a main contactor connected in parallel with the passive ultracapacitor pre-charge circuit to isolate the ultracapacitor.

15. The method of claim 13, further comprising responding to the voltage being above a predetermined threshold voltage by closing the ultracapacitor pre-charge switch and closing a main contactor connected in parallel with the passive ultracapacitor pre-charge circuit before closing the battery pre-charge switch.

16. The method of claim 13, further comprising responding to the voltage being above a predetermined threshold voltage by closing the ultracapacitor pre-charge switch, closing a main contactor connected in parallel with the passive ultracapacitor pre-charge circuit and closing the battery pre-charge switch approximately simultaneously.

\* \* \* \* \*